Feb. 28, 1933.                M. E. TYLER                1,899,169
                              TOOL HOLDER
                           Filed Oct. 24, 1928
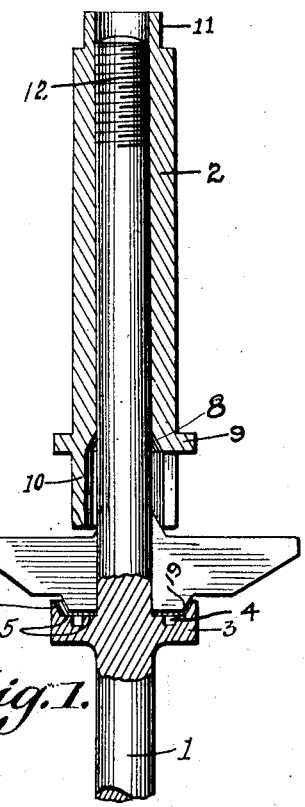
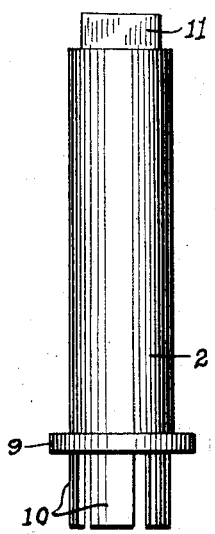
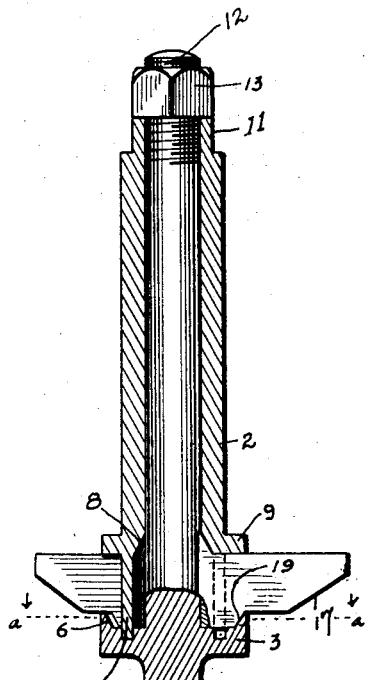
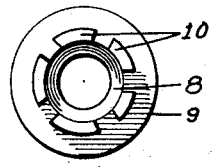
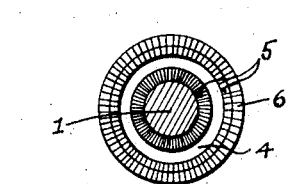
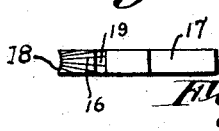
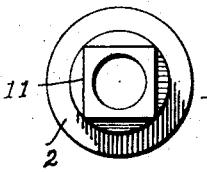
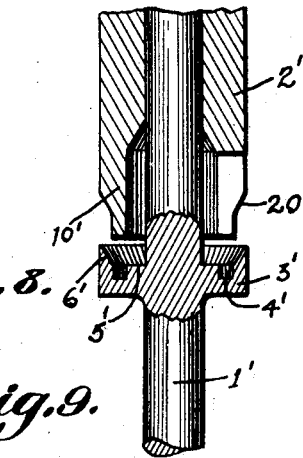
Inventor
Melvin E. Tyler Patented Feb. 28, 1933

1,899,169

UNITED STATES PATENT OFFICE

MELVIN E. TYLER, OF BALTIMORE, MARYLAND

TOOL HOLDER

Application filed October 24, 1928. Serial No. 314,646.

This invention relates to an improvement in tool holders and tools and particularly to that type used in re-facing valve seats in internal combustion motors. However it is not limited to that class of work but may also be used in re-facing seats of valves such as steam, water, and gas valves.

An object of this invention is to provide a holder in which a number of cutting tools may be held by means of a single clamp and locked by a single nut.

Another object of this invention is to provide a tool holder simple to adjust, that at the same time will hold tools rigidly in place.

It is well known that frequently a tool will leave a wave-formed cut surface. This results from a twisting and sudden release of the bit shank as the tool bites into the metal and suddenly releases. This result is avoided in the instant invention by mounting a plurality of cutting tools, spaced circumferentially from one another by unequal angular distances.

The invention is illustrated in the following views, of which:

Fig. 1 is a side elevation showing the clamping holder ready to be slid into place.

Fig. 2 is a view of the slidable holder.

Fig. 3 is a bottom view of the holder slide of Fig. 2.

Fig. 4 shows the holder and tools fully assembled.

Fig. 5 shows a top view of the flange on which the tools are supported.

Fig. 6 is a view showing the cutting tools spaced from each other unequal angular distances.

Fig. 7 is an elevation of a cutting tool.

Fig. 8 is a view of the bottom surface of the tool.

Fig. 9 is a top view of the holder of Fig. 2.

Fig. 10 is a view of a modification.

Proceeding to a general description of the device, 1 is a main support which is provided with an annular flange 3 on which the cutting tools 7 are assembled. As shown in Fig. 1 and Fig. 5 the upper surface of the flange has a flat portion 5 which merges into an upwardly extending cam section 6. An annular groove 4 is formed in the approximate center of 5 although the precise position of the groove is a matter that will depend on tool dimensions and is not considered a part of the invention.

Slidable on member 1 is a clamping sleeve 2 which is counter-bored and slotted at one end to form lugs 10. The inner faces of these lugs merge into a conical cam surface 8. As shown in Fig. 3 the lugs are of unequal arcuate length to maintain the unequal spacing of the cutters, as shown in Fig. 6. In assembled position the lugs take into groove 4, see Fig. 4. The cutting tool is shown in Fig. 7 in a side view. The edge abutting the stem 1 is curved to fit it as shown in Fig. 8 at 18. By this construction a broad bearing contact is secured between the cutter and the pilot stem. This holds the cutter more firmly against the stem, with less setting down of the nut 13 and clamp 2. The cutter is formed with a cam extension 7a which co-operates with cam surface 8. The lower face of the cutter has a flat portion 16, and adjacent thereto a cam section 19.

The cutting edge is shown at 17 at approximately an angle of 45 degrees. However the precise angular form will be determined by the particular kind of work to be done.

The cutters are assembled on the flange 3 as shown in Figs. 1 and 6 and the clamp sleeve is slid on 1 so that the lugs take over the cutters, and the ends of the lugs 10 seat in groove 4. Lock nut 13 is then screwed down on the threaded end of 1 thus firmly holding 2 in place. The inner cam face 8 engaging cams 7a on the cutters and the co-action of cams 19 with cam surface 6 of flange 3 force the cutters radially against 1 and hold them rigidly in working position. As a further precaution to prevent any displacement of the cutters, surfaces 5, 16, 6 and 19 are milled, see Figs. 1, 5, 6, and 8. This milling is approximately radial to permit the radial displacement of the cutters when the slide 2 is forced home.

It will be noted in Fig. 9 that the upper end of the clamp is formed as at 11 to permit the assembled tool to be turned, in the cutting operation, by any suitable wrench or other appropriate instrument. The flange 9 on member 2 affords an additional gripping action on the assembled cutters.

In the modified form of holder of Fig. 10 the member 2' is thicker than in Fig. 1, and the surface 20, by its cooperation with surface 6' gives a somewhat firmer grip between 3' and 10'. The groove 4' is immediately adjacent 6' instead of in the middle section of 5'.

Having thus described my invention, I claim:

1. A valve seat-facing tool holder, comprising a pilot stem carrying an annular ledge, a member axially displaceable on said stem said member having one end slotted to form tongues, said ledge also being formed so that it may have interfitting engagement with said tongues.

2. A valve seat re-facing tool holder comprising a pilot stem having an annular ledge formed on one face with an annular groove and an adjacent cam surface, a member displaceable on said stem, said member being formed with an internal conical cam face, and also formed on one end with tongues for interfitting engagement with said groove in said ledge.

3. In a re-facing tool, in combination, a pilot stem carrying a ledge formed with a groove in its end face, a member axially displaceable on said stem, and slotted at the end adjacent said ledge to form tongues, cutting means mounted on said ledge snugly between said tongues and extending outwardly in a radical direction from said stem, said tongues engaging snugly in said groove and held thereby against outward spreading.

4. In a valve seat re-facing tool, a pilot stem carrying an annular ledge having a cam surface on its top face, a clamping member slidable on said stem and formed interiorly with a substantially conical surface, cutting blades mounted on said ledge and having beveled projections on opposite edges, said projections, conical surface, and cam surface all co-operating to force said cutters into firm engagement with said stem.

5. In a valve seat re-facing tool, a pilot stem, an annular ledge thereon having an annular groove and an adjacent cam face, a clamping member slidable on said stem and formed with an internal cam surface and slotted on one end to form tongues, cutting blades mounted on said ledge and between said tongues and formed with cam projections, said cam face, cam surface, and projections co-operating to force said blades against said stem, and said tongues engaging in said groove to hold said cutters against lateral displacement.

6. A valve seat re-facing tool, comprising a pilot stem having thereon an annular ledge, a clamp member slidable on said stem, cutting blades mounted on said ledge, said clamp being formed on one end with tongues between which the blades are positioned, said ledge being formed to have interfitting engagement with said tongues to prevent outward spreading of said tongues.

7. A valve seat re-facing tool, comprising a pilot stem, an annular flange thereon formed on its upper face with a substantially cone shaped cam surface, a clamp element slidable axially on said stem formed on one end with tongues whose inner faces terminate in an internal cam surface, cutting blades mounted on said flange and projecting between said tongues and formed so that by their engagement with the aforesaid cam surfaces they will be slidably forced into firm contact with said stem.

8. A valve seat refacing tool comprising a pilot stem having thereon an annular ledge, a clamp member slidable on said stem, a cutting blade mounted on said ledge, said clamp member at the end approaching said ledge being spaced from said stem to provide an annular channel, the inner end of said channel being entirely convergent away from said ledge to provide an annular bevel cam face, the end of said clamp member around said channel being slotted endwise and radially, a blade disposed in said slot and extending radially from said clamp member, said ledge having a wall portion overrunning the slotted end of said clamp member and holding it against outward spreading, said blade having a tongue adjacent its inner end, and beveled for engagement with said annular cam face in a manner to cam said blade endwise of itself toward said axis and against said stem, upon approach of said clamp member toward said ledge to clamp said blade between them.

In testimony whereof I affix my signature.

MELVIN E. TYLER.